Patented Jan. 15, 1929.

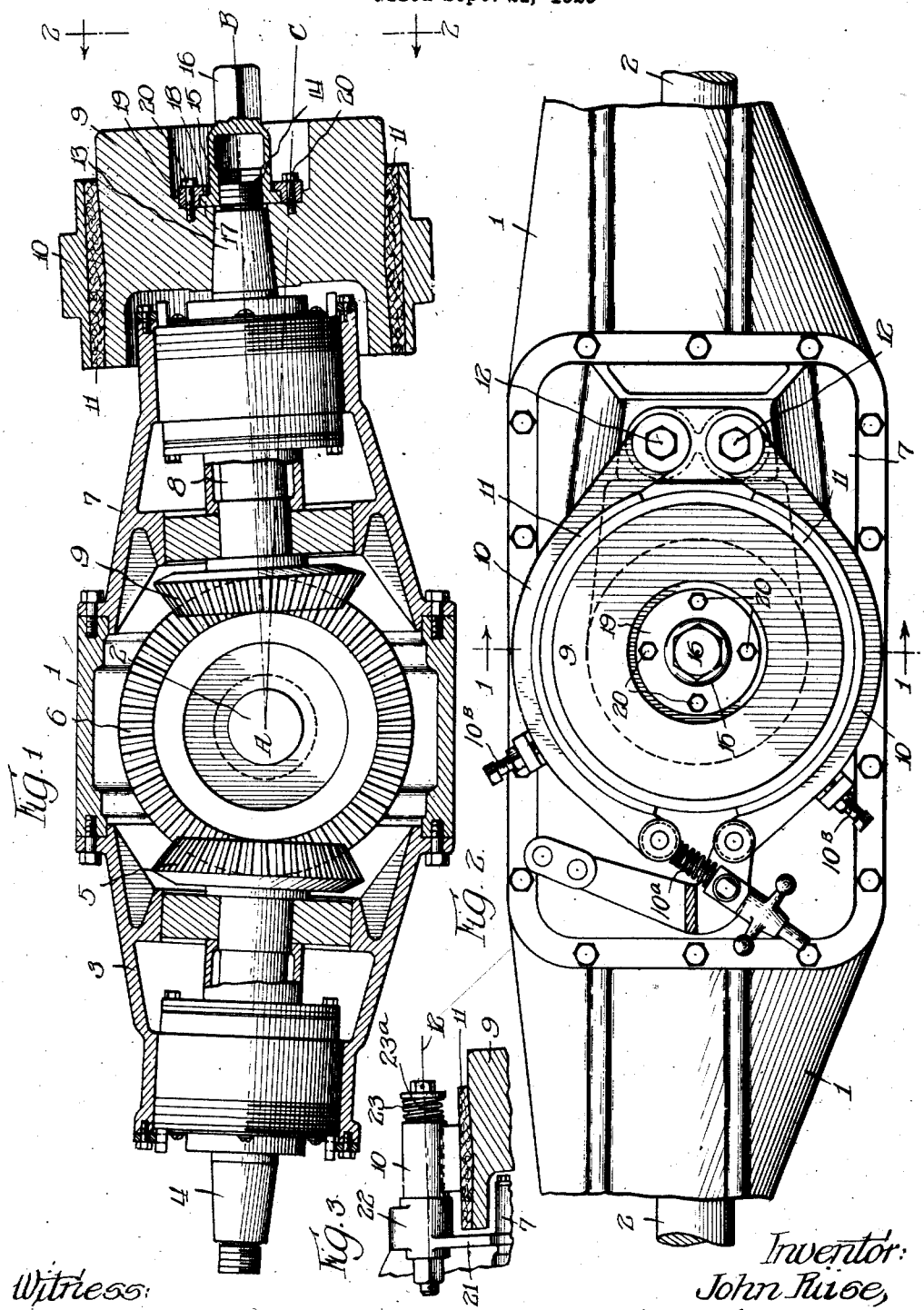

1,699,208

UNITED STATES PATENT OFFICE.

JOHN RIISE, OF DOYLESTOWN, OHIO.

BRAKE.

Application filed September 21, 1925. Serial No. 57,617.

The present invention relates to brakes. More particularly the present invention relates to brakes for motor vehicles and has for one of its objects the provision of powerful braking means suitable for use on trucks, motor buses and other heavy vehicles.

A further object is to provide a brake which will cooperate with the differential gearing in the rear axle of a motor vehicle and which may be assembled upon said motor vehicle or removed therefrom with a minimum of trouble.

A further object is to provide a brake structure which will cooperate with the differential mechanism of a motor vehicle, which will not reduce the road clearance and which will form a pocket for lubricant.

Further objects will appear as the description proceeds.

Referring to the drawings—

Figure 1 is a view taken along the longitudinal center line of a motor vehicle, illustrating a portion of the propelling mechanism of said vehicle, including part of the differential gearing and a portion of the braking mechanism forming the subject matter of the present invention, said section being taken along the plane indicated by the arrows 1—1 of Figure 2;

Figure 2 is a view in rear elevation of the structure shown in Figure 1, said view being taken in the direction of the arrows 2—2 of Figure 1; and Figure 3 is a fragmentary view of a modification of a portion of the braking mechanism.

The numeral 1 indicates the rear axle housing of a motor vehicle, which housing contains the drive shafts 2—2, which are connected to the rear driving wheels of the motor vehicle. Secured in front of the axle housing 1 and providing communication therewith is the housing 3 containing the drive shaft 4, which drive shaft 4 derives its power from the propeller shaft of the motor vehicle. Said drive shaft 4 is provided with the bevel pinion 5, which meshes with the bevel gear 6, which bevel gear 6 drives the shafts 2—2 through any preferred type of differential gearing. Secured to the axle housing 1 in rear thereof and providing communication therewith is the housing 7, which contains the brake shaft 8. Said brake shaft 8 is provided with the bevel pinion 9 meshing with the bevel gear 6. The means providing bearings for the shafts 4 and 8 need not be described herein, inasmuch as bearings suitable for the purpose are well known to those skilled in the art. Preferably said shafts 4 and 8 should have their axes in the same vertical plane, but not in alignment. The angularity between the axes of the shafts 4 and 8 is shown rather exaggerated in Figure 1, said angularity being defined by the angle between the axes A—B and A—C, the axis A—B of the shaft 8 being disposed upwardly of the axis A—C of the shaft 4. From an inspection of Figure 1 it will be apparent that braking mechanism of generous size may be provided on the extremity of shaft 8 without reducing the ground clearance of the motor vehicle.

Secured at the rear extremity of the shaft 8 is the brake drum 9, which brake drum may be controlled by the pair of brake shoes 10—10, which brake shoes are provided with lining members 11—11 for engagement with the periphery of the brake drum 9. Said shoes 10—10 are pivotally connected to the frame of the housing 1 about the axes 12—12. Said brake shoes 10—10 may be controlled by any preferred operating means, certain operating means 10ª being indicated. Inasmuch as said operating means do not constitute the present invention, no description thereof is considered to be necessary. Set screws 10ᵇ—10ᵇ may be provided for limiting outward movement of the brake shoes 10.

The brake drum 9 is secured to the shaft 8 by novel means, which will now be described.

The shaft 8 is provided near its rear extremity with the conical bearing portion 13 which seats within a corresponding conical aperture in the brake drum 9. The extremity of the shaft 8 is screw-threaded, as indicated by the numeral 14, and a nut 15 is provided for engagement with said screw-threaded portion 14. Said nut 15 has its rear extremity of non-round conformation, as indicated by the numeral 16, said non-round portion preferably projecting beyond the rear extremity of the brake drum 9, whereby to simplify the matter of operating said nut 15. Said nut is provided at its forward extremity with the outwardly extending flange 17, the outer face of which flange 17 is adapted to be engaged by the inwardly extending flange 18 of the collar 19. Said collar 19 is held in place on the brake drum 9 by means of bolts 20—20. Said flange 17 should be rotatable relative to said collar 19, for a reason which will appear hereinafter. Said flange 17 will preferably have a circular conformation.

Figure 3 illustrates a detail of construction and shows how the brake shoes 10—10 may be supported from the housing 7 in a manner to conserve space. It will be noted from an inspection of Figure 3 that the rear extremity of the housing 7 is provided with outstanding flanges 21, which have enlarged portions 22 for carrying pins 23. Said pins 23 have the axes 12—12 above referred to, and provide pivotal mountings for the brake shoes 10—10. Springs 23$^a$ hold the brake shoes 10 resiliently in position with respect to the enlarged portions 22.

By reason of the construction illustrated and described, braking mechanism is provided which acts directly upon the differential gearing connected to the propeller shaft, and the present invention provides the means for accomplishing this result, which means may be assembled or disassembled with a minimum of trouble. Moreover, by reason of the angularity in a vertical plane between the driving shaft 4 and the brake shaft 8, the result is obtained that braking means of generous size may be provided without requiring mechanism at a lower level than is involved in the rear axle housing with which it cooperates.

The angular relation between the shafts 4 and 8 also serves to prevent the escape of lubricant, inasmuch as said angular relationship provides a relatively deep pocket in the bottom of the housings 1, 3 and 7, wherein oil or other lubricant may lie at a relatively high level without tending to escape through the packing of the shafts 4 and 8.

The matter of convenience in taking off the brake drum and putting on the brake drum is very simple according to the present invention. Said brake drum is in rear of the rear axle housing and is readily accessible to the workman. Inasmuch as the flange 17 is capable of turning movement within the collar 19, when the nut 15 is backed off from the screw-threaded portion 14 of the shaft 8, said nut will, by reason of this engagement with collar 19, draw said collar along. Inasmuch as said collar is bolted to the brake drum 9, backing off the nut 16 will result in the pulling off of the brake drum 9.

Though a preferred embodiment of the present invention has been described in detail, it will be clear that many modifications will occur to those skilled in the art. It is intended to cover all such modifications that fall within the scope of the appended claims.

What is claimed is:

1. In a motor vehicle, in combination, a rear axle housing, differential gearing therein, a housing connected to said rear axle housing forwardly thereof, a drive shaft for said gearing contained in said forwardly extending housing, another housing extending in rear of said rear axle housing, and a brake shaft contained in said rearwardly extending housing, said brake shaft being connected to said differential gearing, said shafts being arranged in the same vertical plane but in angular relationship to one another.

2. In a motor vehicle, in combination, a rear axle housing, differential gearing therein, a shaft for driving said gearing, and a brake shaft driven by said gearing and extending rearwardly of said housing, said brake shaft being provided with a brake drum, a nut on said brake shaft adapted to hold said drum in place on said brake shaft, abutment means secured to said drum, said abutment means and said nut being rotatable relative to one another, said abutment means having a portion for engagement with said nut when said nut is backed off from said brake shaft.

3. In a motor vehicle, in combination, a rear axle housing, a housing mounted in front of said rear axle housing, another housing connected in rear of said rear axle housing, and shafts carried by said second and third mentioned housings, which shafts have their axes located in the same vertical plane but out of alignment with each other.

4. In a motor vehicle, in combination, a rear axle housing, a housing connected thereto in front thereof, another housing connected thereto in rear thereof, shafts carried by said second and third mentioned housings, beveled pinions upon said shafts, said shafts having their axes in the same vertical plane but having the arc above said axes of less magnitude than the arc below said axes, and braking mechanism carried by the shaft within said rearwardly extending housing.

Signed at Doylestown, Ohio, this 17th day of September, 1925.

JOHN RIISE.